Figure 5:
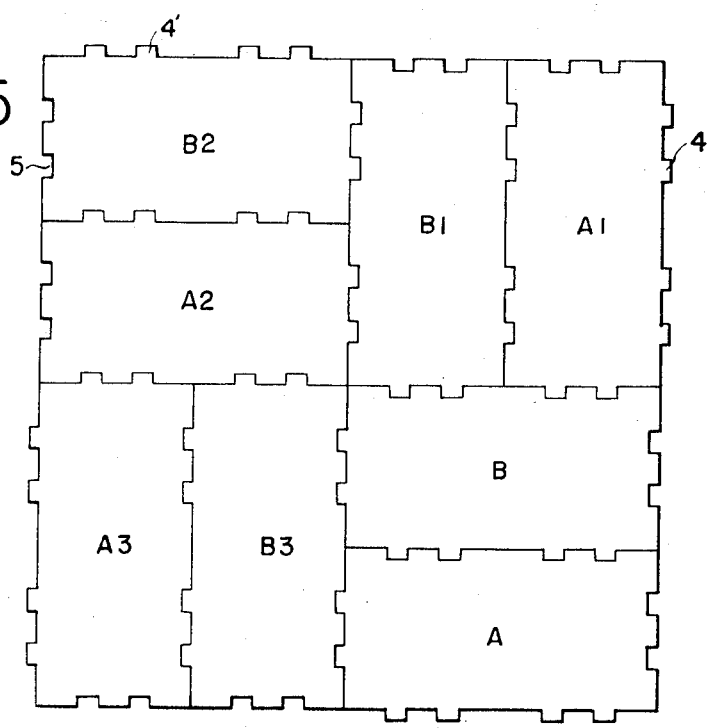

United States Patent [19]
Yoshida

[11] 3,857,749
[45] Dec. 31, 1974

[54] JOINED CARPET UNIT

[75] Inventor: Iwao Yoshida, Kyoto, Japan

[73] Assignee: Sanwa Kako Co., Ltd., Kuze-gun Kyoto-fu, Japan

[22] Filed: Feb. 19, 1974

[21] Appl. No.: 443,633

Related U.S. Application Data

[63] Continuation of Ser. No. 229,301, Feb. 25, 1972, abandoned.

[30] Foreign Application Priority Data

Feb. 26, 1971 Japan.............................. 46-11302
Feb. 27, 1971 Japan.............................. 46-11845
Mar. 1, 1971 Japan.............................. 46-12054

[52] U.S. Cl................. 161/44, 161/37, 161/67, 161/159, 161/247
[51] Int. Cl....... B32b 1/04, B32b 27/32, B32b 3/10, B32b 5/18
[58] Field of Search............................ 161/36–37, 161/44, 62, 67, 63, 159, 111, 247

[56] References Cited

UNITED STATES PATENTS

| 3,533,866 | 10/1970 | Blue................................ 161/159 X |
| 3,654,051 | 4/1972 | Bieler................................ 161/37 |
| 3,695,987 | 10/1972 | Wisotzky et al................ 161/159 X |

*Primary Examiner*—Philip Dier
*Attorney, Agent, or Firm*—Armstrong, Nikaido & Wegner

[57] ABSTRACT

A jointing carpet unit for joining similar units and in the form of plate wherein a processed fiber material such as cloth, felt and the like is laminated onto the surface of a base plate of foamed polymer consisting mainly of ethylene, such as foamed polyethylene and wherein a plurality of concavities are provided on the side surface of the laminted plate and a plurality of convexities in such form that may fit in concavities which are provided on the opposite side surface of an opposing unit.

4 Claims, 6 Drawing Figures

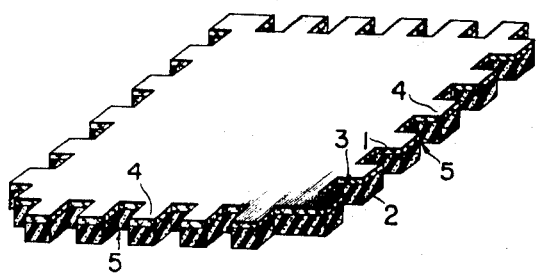
FIG. 1
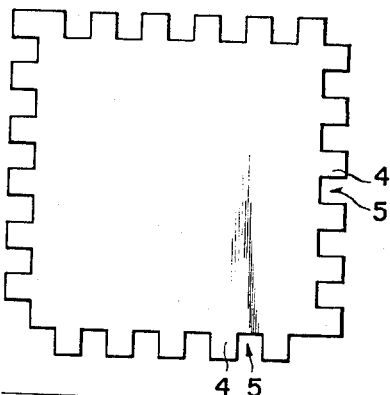
FIG. 2
FIG. 3
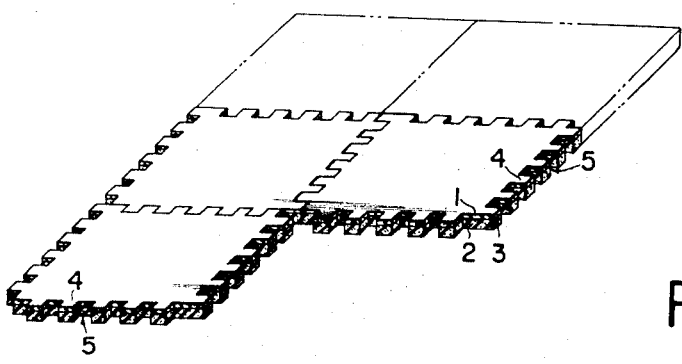
FIG. 4
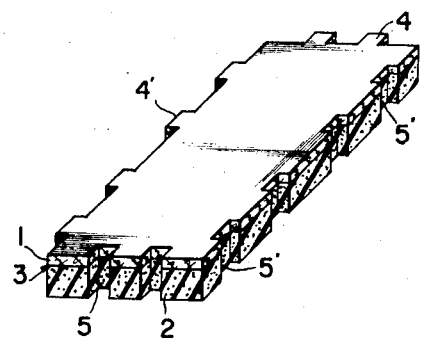

JOINED CARPET UNIT

This is a continuation, of application Ser. No. 229,301 filed Feb. 25, 1972 now abandoned.

This invention relates to a carpet unit capable of joining these units and more particularly to such a carpet unit wherein a foamed polyethylene and processed fiber material are laminated together. More particularly, it relates to a carpet unit wherein a suitable number of concavities and convexities are provided on the side surfaces thereof and a foamed polyethylene and processed textile are laminated together.

For the purpose of most appropriate dwelling and interior decoration, carpets of processed fiber material have been hitherto widely used. Textile carpets have been used for a long time and laminate carpets of textile and polyurethane foam are now often used.

However, these carpets have common disadvantages in that they have only unit area sizes based on the house floor areas so that they cannot be exchanged for each other in desired rooms and that the larger ones are handled more inconveniently. These carpets, on becoming old, curl at the corners resulting in a more reduced life. The curling occurs often in the latter carpets and even the entire carpet often becomes curved. This is caused by the physical properties of polyurethane foam which is laminated to the back surface of the textile and damages the texture and ornamentation of the carpet resulting in a very decreased commercial value. On the other hand, the former carpets are excellent in the dwelling and ornamentation but are too expensive and heavy in handling.

Subsequently, to overcome the disadvantages of both of said types of carpets, carpets of synthetic resin foam such as polyethylene foam or a laminate of polyethylene foam and other synthetic resin foam were marketed and some of them are unit type carpets, which can provide any desired area. According to the unit system, the disadvantage of a restricted unit area of carpet is eliminated to an extent. In such a unit system, it is of importance to join securely the side surfaces of the units. Disadvantageously, however, those which are now on the market produce small gaps in the joints and swellings at the joint portions due to the aging. These carpet classes consist only of synthetic resin foams so that the texture and softness of textile are not accepted at all and the application thereof is restricted. As a result, they are used now, at most, for bath room and kitchen and very seldom for other dwelling rooms.

Accordingly, an object of this invention is to provide joining carpet units for (jointing) together which can be combined in any desired size irrespective of the size of room.

Another object of this invention is to provide carpet units for joining together and which a very excellent workability without the formation of gaps and swellings at the joints due to aging.

Still another object of this invention is to provide a carpet which has an equal or superior performance to carpets of textile only and is light and cheap and excellent in performance in a dwelling.

Another object of this invention is to provide carpet units for joining together which can be applied to rooms of any form or extension.

Still another object of this invention is to provide carpet units for joining together which can enrich colors and only required parts of which can be exchanged readily.

Still further objects and the entire scope of applicability of this invention will become apparent from the detailed description given hereinafter; it should be understood, however, that the detailed description and specific examples, while indicating a preferred embodiment of this invention, are given by way of illustration only, since various changes and modifications within the spirit and scope of the invention will become apparent to those skilled in the art from this detailed description.

The carpet unit for joining according to this invention is in the form of a plate, in which a processed textile is bonded to the surface of a polymer foam consisting mainly of ethylene and onto the side surface of which a plurality of concavities are formed alternating with a plurality of convexities in such form that these features are adapted to fit with corresponding convexities and concavities being provided on other units.

As processed textiles to be used in this invention, there are included cloth, ripple-processed cloth, unwoven cloth, felt and the like of natural fiber such as wool, hemp, cotton etc. as well as synthetic fiber such as nylon, polyester, polyacrylonitrile, polypropylene etc.

The foamed material to be used as a base plate should be foams of polymer consisting mainly of ethylene, such as polyethylene, ethylene-vinyl acetate copolymer, ethylenealkyl acrylate copolymer etc. and preferably the density thereof is 0.05 – 0.08 g/cm$^3$ and the 25% compression hardness 0.65 – 1.1 Kg/cm$^2$. The reason why the density range of 0.05 – 0.08 g/cm$^3$ is preferred is as follows: those having a density of less than 0.05 g/cm$^3$ are fatigued disadvantageously on loading in use and cannot be used for a long time and the joints, when carpet units are joined to each other, are kept even only with great difficulty. To the contrary, a density of more than 0.05 g/cm$^3$ provides a high degree of stiffness and an undesirable elasticity so that the fitting of concavities and convexities for joining carpet units may be difficult and a good feeling as carpet may be not obtained due to the lessened elasticity. The reason why a 25% compression hardness of 0.65 – 1.1 Kg/cm$^2$ is desired is that the hardness range is preferable for the carpet base plate combined with processed textile according to this invention providing a so-called toughness and a comfortable feeling and cushione effect in walking. Other preferable properties of foams of polymer consisting mainly of ethylene to be used in this invention are shown as in Table 1.

TABLE 1

| | |
|---|---|
| Density (g/cm$^3$) | 0.05 – 0.08 |
| Tensile strength (kg/cm$^2$) | 7.5 – 10.0 |
| Elongation (%) | 100 – 150 |
| 25% Compression hardness (kg/cm$^2$) | 0.65 – 1.1 |
| 25% Compression permanent set (%) | 1.5 – 4 |
| Tear strength (kg/cm$^2$) | 3.0 – 4.3 |
| Water absorption (g/m$^3$-24 hrs) | <0.002 |

The comparison of the dwelling aptitude of carpet unit, in which a polyethylene foam is bonded with felt, according to this invention with that of a carpet unit, in which other synthetic resin foam is bonded with a processed textile, is shown as in the Table 2. Foams used for each carpet unit are shown as in the Table 3.

TABLE 2

| Performance | Carpet according to this invention | Cloth | Polyurethane foam + cloth | Polystyrene foam + cloth | PVC foam + felt | Rubber foam + cloth |
| --- | --- | --- | --- | --- | --- | --- |
| Feeling | good | good | rather not good | rather good | rather good | rather good |
| Elasticity | good | good | not good | not good | good | good |
| Durability | good | good | little | little | rather good | rather good |
| Weight | light | rather heavy | light | light | rather heavy | heavy |

TABLE 3

| Physical Properties | Polyethylene | Polyurethane | Polystyrene | Polyvinyl chloride |
| --- | --- | --- | --- | --- |
| Density (g/cm$^3$) | 0.06 | 0.036 | 0.02–0.03 | 0.1 |
| Tensile strength (kg/cm$^2$) | 4.4 | 1.4 | 3.9 | 5.1 |
| Elongation (%) | 320 | 350 | 110 | 210 |
| 25% Compression hardness (kg/cm$^2$) | 0.8 | 0.06 | 1.1 (4% Compression) | 0.16 |

Figure 6:
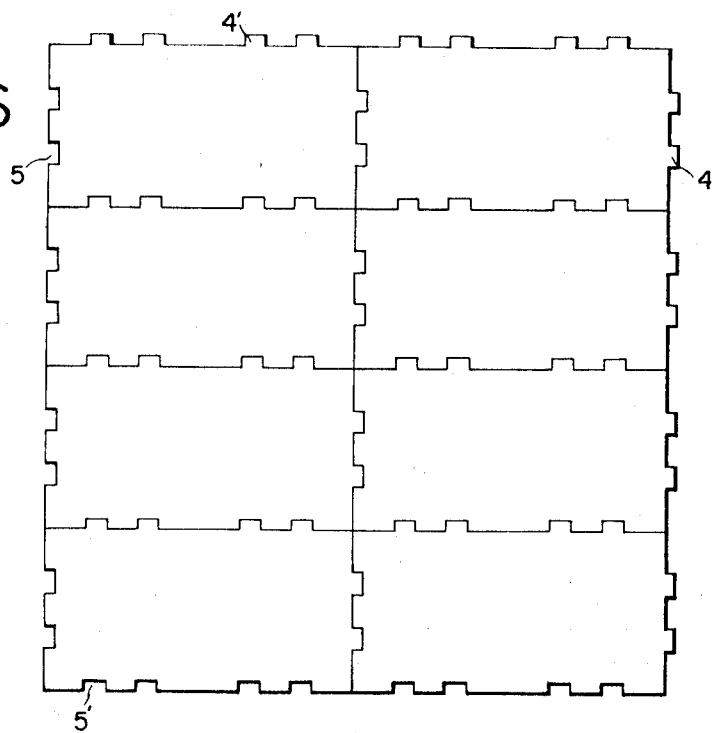

This invention will be readily understood from the following description, when read together with the drawings, wherein:

FIG. 1 is a perspective view of the carpet unit for joining according to this invention, FIG. 2 is a plane view of said carpet unit, FIG. 3 is a perspective view showing the application of said carpet units being joined, FIG. 4 is a perspective view showing another example of said carpet unit according to this invention, FIG. 5 is a plane view showing the combination of said carpet units as shown in FIG. 4, and FIG. 6 is a plane view showing another combination of said carpet units.

As seen from FIG. 1 and 2, the carpet unit for joining according to this invention is a square plate, in which a processed fiber material 1, such as felt, is bonded to the surface of a base plate 2 of foam material composed of polymer consisting mainly of ethylene, a plurality of square convexities 4 and concavities 5 for joining carpet units being provided on the side surfaces of said plate and convexities being in such form that may fit in said concavities provided at the corresponding opposite position in adjacent units. The shapes of convexities 4 and concavities 5 should be such as to fit each other and are therefore in general in the form of square as shown in FIG. 1 and 2; they may be in the tapered or adversely tapered shape. The convexities 4 should necessarily correspond to the concavities 5 though they are not necessarily at equal intervals.

As a process for bonding a processed fiber material 1 such as cloth, ripple-processed cloth, felt etc. onto the foamed base plate 2, there is mentioned here a process wherein an adhesive 3 is used to bond them. Also known is a process wherein the surface of a foamed polyethylene material is made molten with heat and a processed fiber material is pressed thereon, a process wherein a finely divided powder of, for example, polyethylene is made molten and placed between the surface of foamed material and the back surface of a processed fiber material and another process wherein a thermo-setting resin in place of finely divided polyethylene is used to bond, and other various processes.

The thickness of said carpet unit for joining may be varied within the range from several to several tens of millimeters corresponding to the purpose and place by the selection of thickness of foam material as a base plate.

For the application of a carpet unit according to this invention, the convexities 4 formed on the side surface of each unit are fitted, as shown in FIG. 3, in the corresponding concavities 5 formed on the side surface of other unit designed join the first unit to; a suitable number of said units are used corresponding to the purpose and size of room.

Hereinbefore, a square carpet unit for joinder has been known in which convexities 4 and concavities 5 have been provided regularly on the side surface of said unit as described, but the convexities and concavities are not necessarily uniform and the unit may have any desired shape. As seen from FIG. 4, which shows another example of this invention, in the unit in which the processed fiber material 1 is laminated in the same manner as mentioned above through, if necessary, an adhesive 3 on the surface of foam material of polymer consisting mainly of ethylene, the longitudinal length is two times of the width. Two convexities 4 are provided, as shown for example in FIG. 4, on the width or lateral side surface and two corresponding convexities 5 in such form that may fit in the concavities 4 are provided on the opposite side surface; two concavities 5' to fit said two convexities 4 on the lateral side surface are provided half the distance along the longitudinal side surface and likewise concavities 5' are provided on the remaining half. The corresponding number of concavities 5' are provided on the remaining half. The corresponding number of concavities 4' capable of fitting in said convexities 5' are provided on the opposite longitudinal side surface. The above description describes a carpet unit having two convexities on the lateral side surface and, if necessary, a greater number of convexities and concavities can be provided.

For the application of such carpet units, as shown in FIG. 5, the unit $A_1$ and $B_1$ are joined by fitting the concavities in the convexities on the longitudinal side surface, the convexities 4 on the lateral side surface of another unit $A_2$ and $B_2$ and the concavities 5 on the longitudinal side surface of still another unit $A_3$ and $B_3$ are fitted in the concavities and convexities of said unit $A_1$ and $B_1$ and such combinations are employed in sequence to yield a desired size of carpet. As shown in FIG. 6, a simple combination may be employed in which carpet units are combined by jointing them only along longitudinal and lateral side surfaces.

Based on the disclosure as set forth above, the carpet unit suitable for joinder with compatible units according to this invention is excellent in use resistance and ornamentation compared with previous expensive textile carpets and above all, the suitable cushion effect provides an unprecedented feeling resulting in a comfortable effect in use. The lamination of foam material of polymer consisting mainly of ethylene and processed fiber material reduces the cost and the unit system simplifies greatly the handling and transportation in providing light products. Owing to the unit system of this invention, only a required number of units may be used corresponding to the purpose and the size of room without waste and units of various colors and patterns can be used to provide any desired patterned carpet.

Compared with the previous carpet unit by the combination of textile with foamed material such as polyurethane, rubber and polyvinyl chloride foam, the combination of a processed fiber material with a foamed material of polymer consisting mainly of ethylene in the carpet unit according to this invention displays a preferred synergistic effect and a strong laminate adhesion iss formed without the formation of curling and bending on the surface of carpet. Moreover, the joining members which are important parts of the carpet of unit system are not deformed or separated owing to the appropriate stiffness of the processed fiber material on the surface layer even when a load is provided, so that the jointed portion may be kept evenly and strongly. Accordingly, the surface of the carpet units occurring to this invention can always be kept even without disadvantages such as gaps at the joining portions and the swelling of joining portions through aging and without the accumulation of dust. In the carpet unit according to this invention, the thickness of foamed material a base plate can be varied within the range from several to several tens of millimeters so that they may be applied directly even on a rough floor and concrete resulting in an excellent use resistance and viability.

Further, the joined carpet according to this invention is of a unit system type so that even if the carpet is contaminated or injured partially, only the damaged portion may be removed and replaced by new carpet unit resulting in that a clean carpet can always be maintained. The fibrous feeling, which could not be obtained in previous carpets of foamed polyethylene alone, is provided on the surface layer of said joined carpet units. The kind of processed fiber materials and the foam proportion in the foamed material as a base plate can be adjusted appropriately to use as a mat or carpet so that carpets suitable for Japanese or Eastern style rooms can be obtained resulting in a very comfortable use.

Overcoming the previous conceptions, the carpet unit according to this invention renews the value and application of carpet and has a very high practical application.

What is claimed is:

1. A carpet unit in the form of plate composed of a processed fiber material bonded on the surface of a base plate of foamed material composed of a polymer consisting mainly of ethylene and wherein a plurality of concavities are formed on a side surface of said plate and a plurality of alternating convexities are located thereon such that the said carpet unit is adapted to be joined with a plurality of said units with corresponding concavities and convexities.

2. A carpet unit in the form of plate composed of a processed fiber material bonded on the surface of a base plate of foamed material of polymer consisting mainly of ethylene, said material having a density of $0.05 - 0.08$ g/cm$^3$ and a 25% compression hardness of $0.65 - 1.1$ kg/cm$^2$, and wherein a plurality of concavities are formed on the side surface of said plate and a plurality of alternating convexities are located thereon such that the said carpet unit is adapted to be joined with a plurality of said units with corresponding concavities and convexities.

3. A carpet unit according to claim 2, wherein said foamed material of polymer consisting mainly of ethylene is polyethylene foam.

4. A carpet unit according to claim 3, wherein said processed fiber material is felt.

* * * * *